June 28, 1932.  H. F. HOBBS  1,864,824
AUTOMATICALLY VARIABLE TRANSMISSION GEAR, PARTICULARLY FOR MOTOR VEHICLES
Filed June 27, 1931   5 Sheets-Sheet 1

WITNESS
Geo. V. Naylor

INVENTOR
H. F. Hobbs
BY Munn & Co.
ATTORNEYS

Patented June 28, 1932

1,864,824

UNITED STATES PATENT OFFICE

HOWARD FREDERICK HOBBS, OF PARADISE, SOUTH AUSTRALIA, AUSTRALIA

AUTOMATICALLY VARIABLE TRANSMISSION GEAR, PARTICULARLY FOR MOTOR VEHICLES

Application filed June 27, 1931, Serial No. 547,353, and in Australia September 2, 1930.

The purpose of this invention is to provide an improved variable transmission gear in which the ratio of speeds between the driver and the driven shafts will be automatically varied to compensate for differences in speed and load, such gear being especially suitable for the power transmission in motor vehicles but applicable also to other purposes where a variable transmission gear is required.

According to this invention a series of weights are caused to move first eccentrically and finally concentrically about concentric shafts, one of such shafts (the driver) rotating in a fixed direction, the other (the driven) being rotated in a constant but variable direction through two or more intermediate concentric shafts which intermediate shafts have means to cause the weights to move eccentrically in all speeds other than when the driver and driven shafts are rotating at the same speed and in the same direction. The drive exerted by the intermediate shafts through the action of the weights is normally at first in an alternating direction then in the one direction but alternately speeding up and slowing down and finally in the one direction at the same speed as the driver shaft. In the first case however the drive in one direction is prevented by a ratchet gear and is thus turned into constant unidirectional impulses, the direction being changeable at will by means of the ratchet gear. In the second case the ratchet does not operate. In both these cases the impulses are transferred to the driven shaft as a steady rotation by flexible couplings between the intermediate shafts and the driven shaft. In the third case the speeds of the driver and of the driven shaft are equal and in the same direction and the weights then move concentrically about the shafts and transmit a steady unidirectional drive to the intermediate shafts and thus through the flexible couplings to the driven shaft.

In order that my invention may be the more clearly understood I will describe the same with reference to the accompanying drawings in which:—

Fig. 10A is a longitudinal section of the roller cage.

Figs. 2 to 10A and 12 to 17 are drawn to a larger scale than Fig. 1 and Fig. 11 is to a larger scale again.

The gear constituting the invention is contained in a housing 1 attached to the chassis of the vehicle or to a suitable frame.

The driver shaft 2 from the engine of the vehicle has rigidly secured upon its end a frame or casing which carries two sets of weights 9 and 65 and which also acts as a fly wheel to the engine.

The frame or casing 3 comprises a front plate 4, a rear plate 5 and an annular distance piece 6 all rigidly held together. The two plates 4 and 5 have in their faces equally spaced recesses in which are the bearings 7 for the weights of the sets, and in the rear plate 5 there is a bearing 8 for the intermediate shaft 14 while in the front plate 4 there is a bearing 68 for the intermediate shaft 67, the bearings being concentric with the driver shaft 2. Each of the weights of each set comprises a spindle 10 a pinion 11 and an eccentrically placed block 12. The spindles 10 of the sets of weights are equally spaced around the plates of the frame or casing, the sets being so adjusted that they give equally spaced impulses and the blocks 12 of each set being so arranged that they commence their inward movement or their outward movement at the same time.

The pinions 11 of the sets of weights 9 and 65 engage gear wheels 13 and 66 upon two intermediate shafts 14 and 67 one within the other, there being a separate shaft for each set of weights, such shafts being in line with the driver shaft and having their front ends supported in the beforementioned bearings 8 and 68. The one shaft 14 which I will call the outer intermediate shaft has the one gear wheel 13 secured upon it, while the other 67, the inner intermediate shaft, has the gear wheel 66 secured upon it, such gear wheel having an annular flange 69 which fits over the beforementioned bearing 68 located in the front plate 4 of the frame or casing 3. The outer intermediate shaft 14 is hollow and fits over the inner intermediate shaft 67. The two gear wheels 13 and 66 are held to the shafts 14 and 67 by lock nuts 16 and 70.

Each of the intermediate shafts 14 and 67 is provided with a ratchet gear 20, there being a common outer member 21 and a common cage 23 but two separate inner members 40 and 72 the one 40 secured directly upon the outer intermediate shaft 14 and the other 72 secured upon a sleeve 73 surrounding the intermediate shaft 14. The sleeve 73 is connected to the shaft 67 by gear wheels which will be described later.

The outer member 21 is ring-shaped and is concentric with the intermediate shafts 14 and 67 and has in its inner face a number of curves 22 of a radius somewhat smaller than the radius of the inside of the member. It is secured to the housing 1 of the gear.

The roller cage 23 consists of a cage 24 having through it two rows of holes 25 adjacent the curved faces 22 in the outer fixed member 21. Within the two rows of holes 25 are rollers 26 and 79 of diameter slightly greater than the thickness of the cage 24. The holes 25 are sufficiently long to allow the rollers 26 and 79 a small amount of radial movement, but such rollers are normally held in their central position by small blocks 27 slidable in grooves 28 in the cage 24. Each of these blocks 27 has a spring 29 in the form of a steel wire passed through its centre, the outer ends of which springs are held in perforations in two rings 30 secured to the cage. The springs pass through elongated holes in the cage 24. The cage 24 is held in position by its outer edges entering circular grooves 31 in the outer member 21 and in the housing 1, and it has an upwardly projecting stem 32 which terminates in a small toothed segment 33 engaged by a small pinion 34 on a control shaft 35.

The pinion 34 is loose on the shaft 35 but has within it a keyway which fits over a lug 36 upon the shaft 35. The keyway is of greater width than the lug, and the pinion can thus rock upon the shaft but it is normally held in its one position by a spring 37 which has its one end connected to the pinion 34 and its other end connected to the control shaft 35. This gives a slight flexibility and allows the case 23 to adapt itself to its best working position. The shaft 35 is locked in position by a pin 38 engaging holes in a member 39 secured to the housing 1 of the gear. The control shaft 35 is provided with a hand wheel 41 which is slidable upon the shaft and which is prevented from rotating thereon by a spline. The pin 38 is connected to the wheel 41 so that it is raised and lowered with the wheel.

By setting the roller cage 23 in the one direction all movement of the intermediate shafts 14 and 67 is prevented in that direction by the respective sets of rollers 26 and 79 moving toward that end of the curved faces 22 and wedging between such curves 22 and the inner members 40 and 72.

By setting the cage 23 in the opposite direction the intermediate shafts 14 and 67 are held against rotation in that direction.

By setting the cage to its central position the intermediate shafts 14 and 67 are free to rotate in either direction.

The flexible couplings 45 comprise two torsional springs 83 and 84 constructed of a number of leaves and contained within a tube 85 of comparatively large diameter. These springs 83 and 84 are secured at their forward ends to short shafts 86 and 87 carried in bearings 88 formed in plates 89 and 90 attached near the front end of the tube 85 and these shafts have pinions 91 and 77 respectively formed integral with them. These pinions mesh respectively with two pinions 93 and 78 one upon the rear end of each of the intermediate shafts 14 and 67.

The rear end of the before-mentioned sleeve 73 has upon it a gear pinion 75 which meshes with the one member 76 of a gear wheel having two rings of teeth 76—77. The other member 77 of this double gear wheel meshes with the pinion 78 upon the rear of the intermediate shaft 67. The shafts 67 and 73 are thus connected together to rotate as one. The double gear wheel 76—77 thus serves both as the connection to the one spring 84 and the connection of the sleeve 73 to the intermediate shaft 67. The rear end of each of the springs 83 and 84 is attached directly to a plate 94 upon the rear end of the tube 85. The tube 85 is constructed to act as a fly wheel and will be referred to as the first fly wheel. The plate 90 within this tube has the front end of a torsional spring 95 secured to it, which spring is attached intermediate its ends to a tube 96, supported in bearings 97, while its rear end is attached to the driven shaft 46. The rear end of this tube 96 has a fly wheel 98 upon it. The beforementioned tube 85 is supported at its front end by a bearing 81 upon the sleeve 73 and at its rear by a bearing 82 upon the tube 96.

Figure 15:
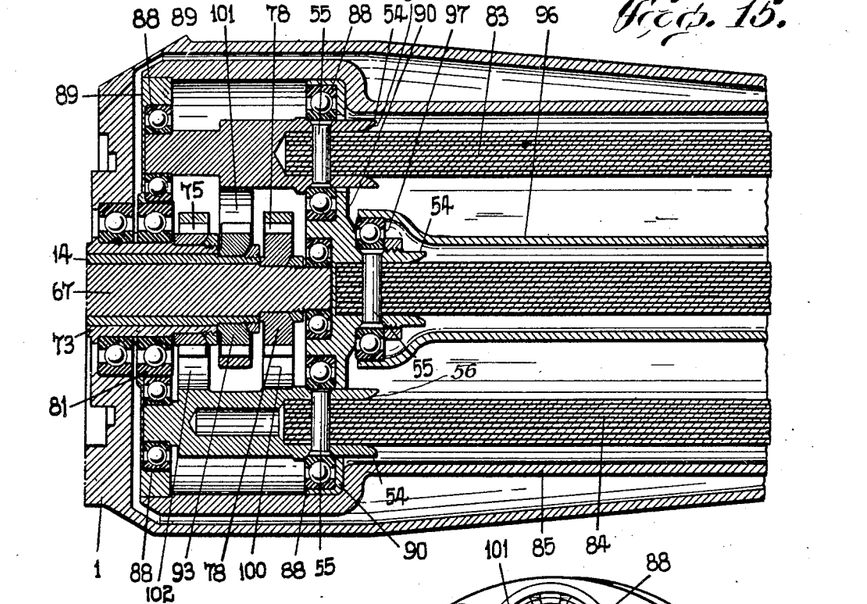
Fig. 15 is a central vertical section of the centre portion of a gear similar to that shown in Fig. 10 but wherein the gearing between the intermediate shafts and their flexible couplings is somewhat modified.
Figures 16, 17:
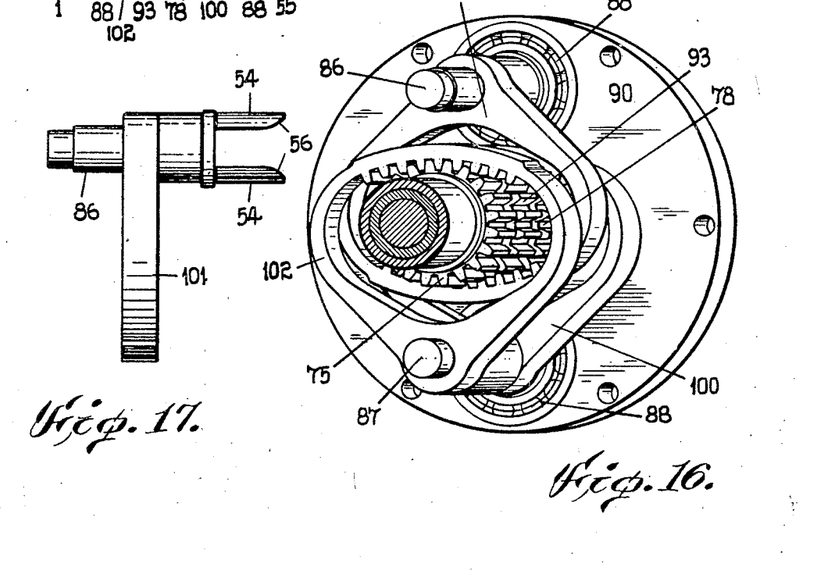
Fig. 16 is a perspective view corresponding to Fig. 12 showing the modified gearing.
Fig. 17 is a side elevation of the gear wheels 101 used therein.

In the modification shown in Figs. 15 to 17 the pinions 100, 101 and 102, corresponding to the pinions 77, 91 and 76 meshing with the gear pinions 78, 93 and 75 upon the intermediate shafts 67 and 14 and sleeve 73 have their teeth internal instead of external. This gives a greater ratio between the intermediate shafts 14 and 67 and the springs 83 and 84 of the coupling and thus permits of the use of shorter and stronger springs.

The attachment of the springs 83, 84 and 95 to the ends of the shafts 86 and 87 and to the disc 90 and disc 94 and to the tube 96 and coupling 46 (sometimes termed the driven shaft) in each case preferably consists of a pair of fingers 54 upon such part adapted to grip the spring 47 at that point. A bolt or rivet 55 passing through a perforation in such fingers 54 and in the spring 47 holds the spring in place within the fingers. The ends of the fingers 54 are tapered off as shown at 56 to prevent fracture of the spring.

By means of these springs 83, 84 and 95 of the flexible coupling 45 the impulses of the intermediate shafts are turned into a constant rotation, the springs being wound up as the impulses are applied to their front ends by the gear and unwinding constantly at their other ends and so steadily rotating the driven shaft 46. The fly wheels 85 and 98 intermediate the ends of the springs serve the purpose of changing the effective length of the springs for impulses of different speeds. When the number of impulses applied to the springs 83 and 84 during a given time are high they are damped out at and by the first fly wheel 85 which cannot fluctuate so quickly, so that the spring 95 is only giving a constant drive. As the number of impulses becomes lower however this fly wheel more nearly follows the fluctuations of the springs and the main fly wheel 98 comes into operation. By this coupling a very high efficiency is given to the gear. The effect may be increased by the provision upon the springs 83, 84 and 95 of additional auxiliary fly wheels attached to such springs intermediate their ends and supported in suitable bearings.

Figure 1:
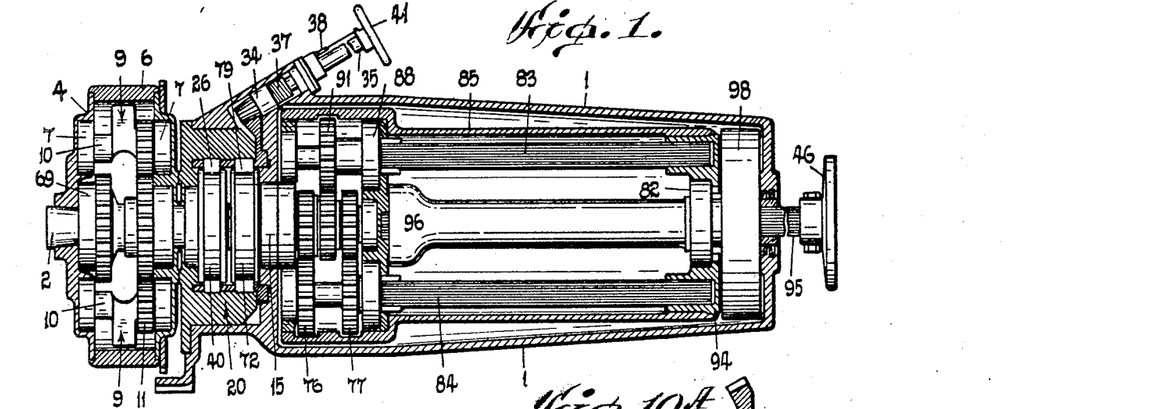
Fig. 1 is a side view of the gear showing the case and the tube 85 in section.
Figure 2:
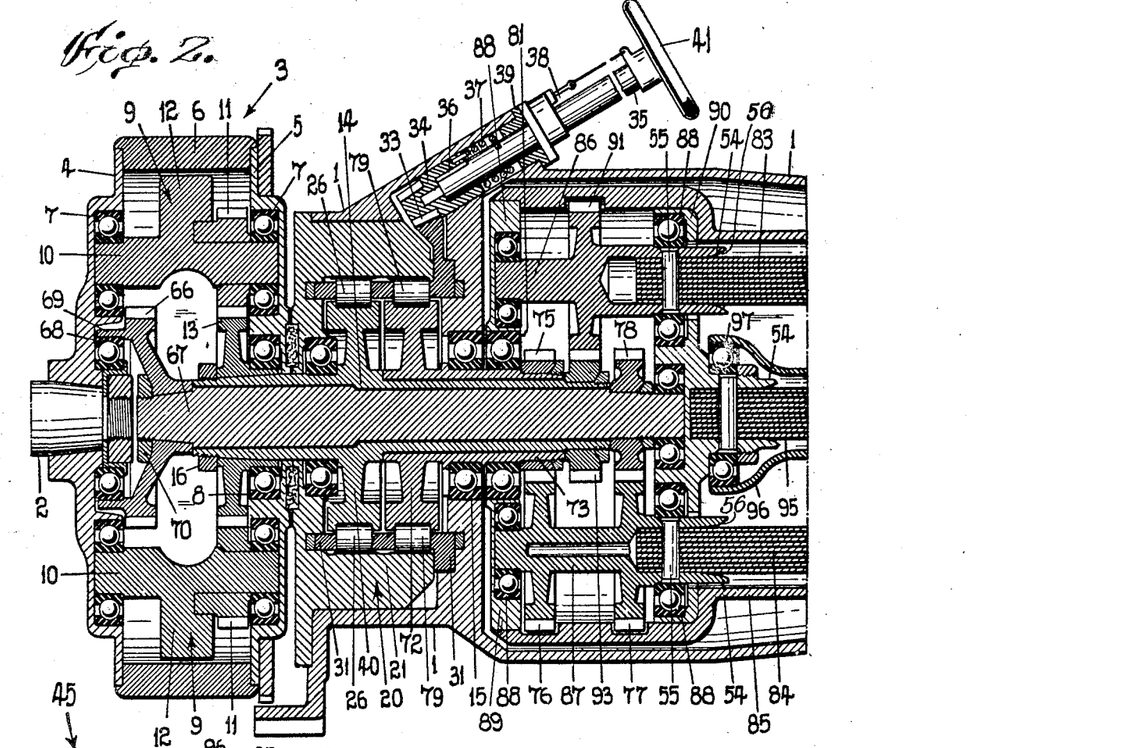
Figures 2 and 3 comprise a central section of the gear.
Figure 3:
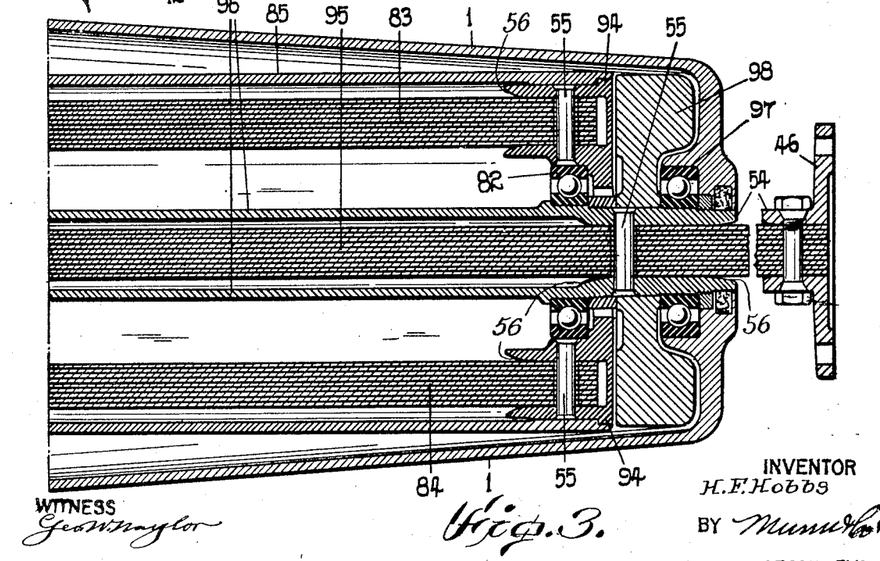
Figures 4, 12, 13, 14:
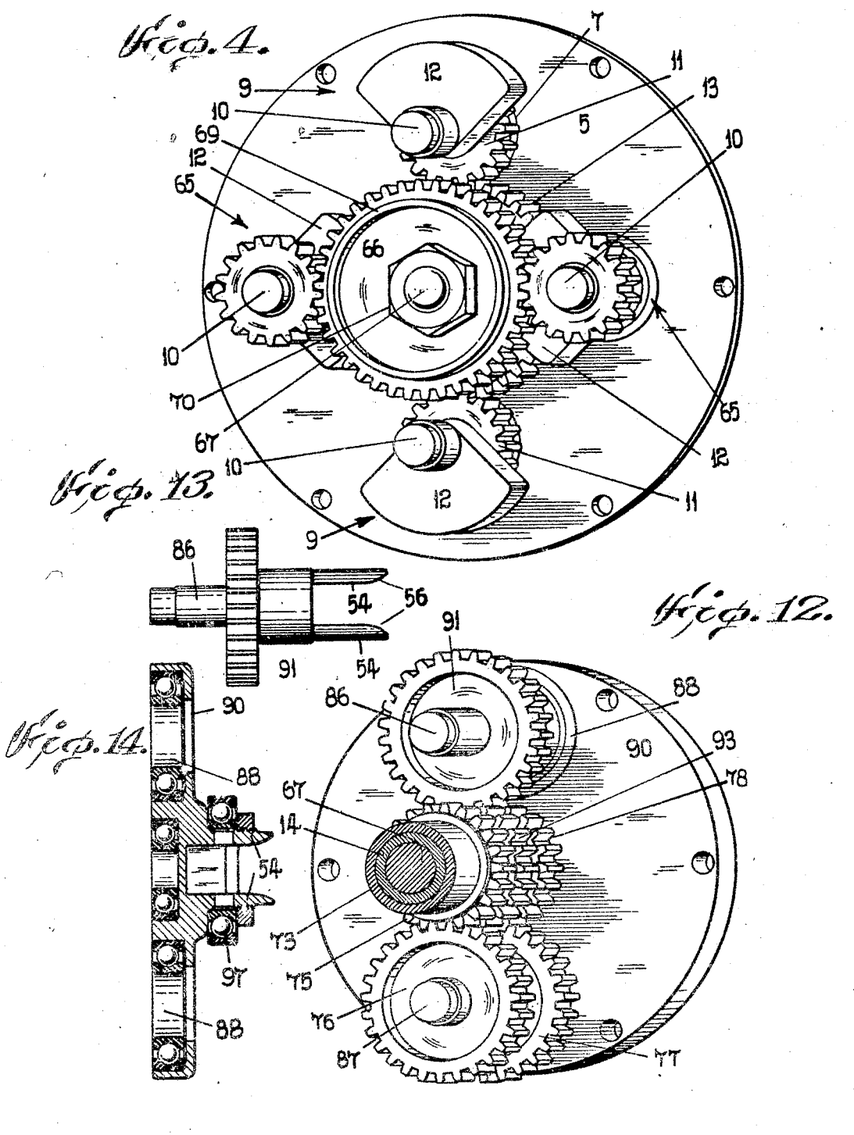
Fig. 4 is a perspective view of the weights which when driven produce the forces which actuate the gear. The view also shows the gear wheel upon the intermediate shaft and the back plate of the case.
Fig. 12 shows in perspective the gearing used between the intermediate shafts and their flexible couplings.
Fig. 13 is a side elevation of the gear wheel 91 shown in Fig. 12.
Fig. 14 is a central section of the plate which supports the gear wheels.
Figure 5:
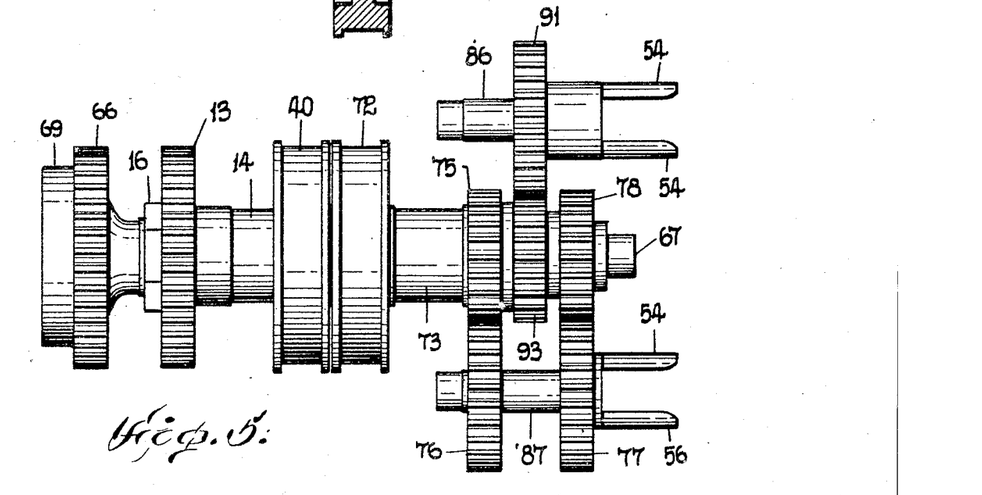
Fig. 5 shows the intermediate shafts removed from the gear showing also the gear wheels by which they are driven, and their connection to the flexible couplings and inner members of the ratchets.
Figures 6, 7, 8:
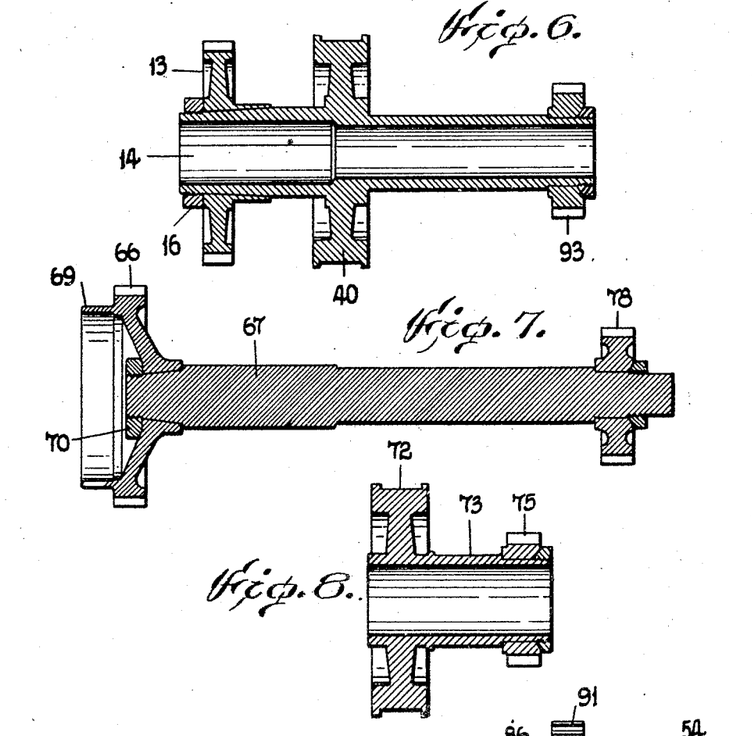
Fig. 6 shows in section the outer intermediate shaft 14.
Fig. 7 shows in section the inner intermediate shaft 67.
Fig. 8 shows in section the sleeve 73.
Figures 9, 10:
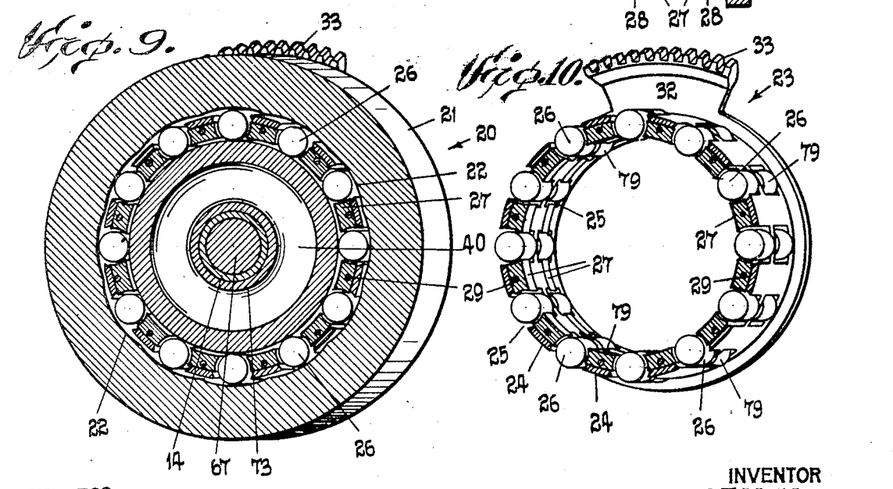
Fig. 9 is a cross section of the ratchet gear, the view being in perspective, the rollers not being shown in section.
Fig. 10 is a similar view to Fig. 9 but showing only the rollers and cage of the ratchet gear.
Figure 11:
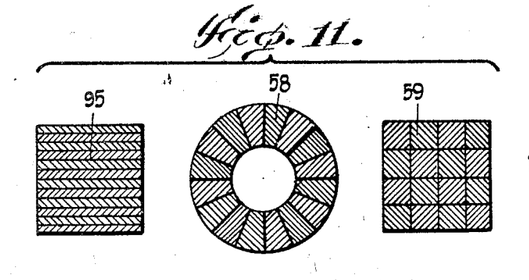
Fig. 11 shows in section some of the forms of springs which may be used in the flexible couplings.
Figure 12:
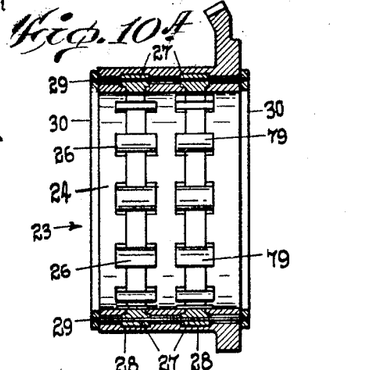

Instead of constructing the springs of square section and built up of flat leaves as shown in Figs. 1, 2, 11 and 15 of the drawings (this shape is shown at 95 of Fig. 11) they may be constructed of leaves of other suitable section such for instance as those shown at 58 and 59 of Fig. 11. Instead of building the spring up of leaves it may be formed of a shaped piece of spring steel having a number of longitudinal cuts through it. It may be built up of short lengths joined together by suitable couplings.

I will now describe the operation of my device.

When the driver shaft 2 is rotated it carries with it the frame or casing 3 which is attached to it and which carries the sets of weights 9 and 65. When starting, as the weights move around their intermediate shafts 14 and 67 they are rotated also about their spindles 10 through the pinions 11 on the spindles meshing with the gear wheels 13 and 66 upon the intermediate shafts 14 and 67 which shafts are then stationary or gradually speeding up and thus the centres of gravity of the blocks 12 of the weights trace out an eccentric path around the axis of the driver shaft 2.

It will be seen that the blocks 12 in their eccentric course may move inwards once for part of a revolution or once for one or more revolutions depending upon the difference in speeds between the driver and driven shafts.

As the speed of the driver shaft 2 increases, the centrifugal force on the weights 9 and 67 increases causing the blocks 12 to tend to stay in their outermost position.

Acting against this force, however, is the resistance of the intermediate shafts 14 and 67 which are connected by the flexible couplings 45 to the driven shaft 46 the resistance of which is governed by the load upon it.

As the weights 9 and 67 are being rotated the centres of gravity of their blocks 12 are being pulled inwards against the outward action of the centrifugal force for half of their revolution about their spindles 10 but are pulled outwards by the action of the centrifugal force for the other half of their revolution.

Thus it will be seen that the weights 9 and 67 require a driving force during their inward movement, but exert a driving force during their outward movement. Thus the reaction of each set of weights during its inward movement tends, through the pinions 11 and gear wheels 13 and 66 to drive the intermediate shaft 14 or 67 connected to it around in the same direction as the driver shaft 2 is rotating, but during the outward movement each set of weights tends to drive its intermediate shaft in the opposite direction.

Each intermediate shaft 14 and 67 thus tends at first to be driven in a forward and backward alternating direction, but by means of the ratchet 20 all movement in one direction is prevented, the intermediate shafts 14 and 67 thus rotating in one direction only, but by a series of short impulses. The springs 83, 84 and 95 of the flexible drive coupling 45 between these intermediate shafts and the driven shaft turns these impulses into a constant rotation by storing in the springs of the coupling part of the force imparted to such coupling during the impulse of each of the intermediate shafts 14 and 67 the springs giving such force to the driven shaft during the time when the intermediate shafts are held stationary. The flexible couplings thus differentiate between the maximum and minimum drive, and exert a steady automatically variable low ratio drive in either direction, the direction depending only on the positioning of the cage 24 which controls the rollers 26 and 79 of the ratchet gear 20.

When the ratchet gear 20 is so set that the driver shaft 2 and the driven shaft 46 are rotating in the same direction the ratio of speeds between the driver and driven shafts will at first be greatly different but, as it continues and when the ratio of speeds between these two shafts becomes more nearly equal, the inward movement of the blocks 12 of the weights 9 and 65 will drag the intermediate shafts 14 and 67 through a greater angle and the tendency of the intermediate shafts to move backward will decrease until it is only a slowing down movement, the ratchet 20 then ceasing to operate.

The flexible couplings 45 in this case again store in the springs 83, 84 and 95 part of the force imparted to them during the impulses or speeding up of the intermediate shafts 14 and 67, the spring giving such force to the driven shaft during the slowing down period of the intermediate shafts and thus differentiating between the maximum and minimum drive. This gives an intermediate drive having an automatically variable ratio varying automatically because the paths of the weights will vary in accordance with the force and speed of the driver shaft and the resistance and speed of the driven shaft, thus the inward and outward movement of the weights will take place at longer or shorter intervals, the resultant drive being in a forward direction.

When the resistance of the driven shaft is equal to or less than the drive exerted by the driver shaft the weights take up a constant position which is governed by the force and speed of the driver shaft and the resistance and speed of the driven shaft. The resultant speed between the driver and driven shafts is in this case of a one to one ratio. When the impulses given to the springs 83, 84 and 95 of the flexible couplings 45 are short and of high frequency as during the time when the ratchet 20 is in operation it is desirable to use only a short length of spring to obtain maximum efficiency, but as the impulses increase in length and decrease in frequency a longer spring is desirable as it again increases the efficiency and gives a more constant drive.

By means of the fly wheel 85 this object is achieved as the fly wheel by its momentum cannot follow quick fluctuations and it therefore damps out any very high fluctuations at that point so that only the springs 83 and 84 of the couplings are in operation, the spring 95 simply acting as a driven shaft but, as the frequency decreases this fly wheel starts to follow the fluctuations which however are reduced by it and are damped out by the second fly wheel 98. A further spring in series with the spring 95 and a further fly wheel may be used if this coupling does not smooth out the slow fluctuation prior to the one to one ratio.

When in the lower ratios, the weights 9 and 65 act more or less independently but as the ratio increases, and especially when the one to one is reached, the independent action is lost and the whole of the weights act in conjunction. The flexibility of the springs 47 and 83 in the coupling here help to determine the position of the weights near and in the one to one ratio.

It is to be understood that the weights 9 and 65 are to be so set as to give alternate impulses.

Instead of using two sets only three or more sets may be used they being spaced to give equally spaced impulses. Two or more weights may be used for each set.

What I claim is:—

1. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a driven shaft, and at least two sets of straight bars each set connected together to form a torsion spring which is connected at one end to one of the intermediate shafts and at its other end to the driven shaft so that each intermediate shaft is connected independently to the driven shaft by a torsion spring.

2. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a driven shaft, at least two sets of straight bars each set connected together to form a torsion spring which is connected at one end to one of the intermediate shafts and at its other end to the driven shaft so that each intermediate shaft is connected independently to the driven shaft by a torsion spring, and at least one flywheel carried by the said springs and located intermediate the ends thereof.

3. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a driven shaft, at least two sets of straight bars each set connected together to form a torsion spring which is connected at one end to the driven shaft, a separate gearing connection between each torsion spring and its associated intermediate shaft so that the torsion springs are capable of independent twisting movement, the arrangement being such that each intermediate shaft is independently connected to the driven shaft by gearing and a torsion spring.

4. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a flywheel, at least two sets of straight bars each set connected together to form a torsion spring which is connected at one end to one of the intermediate shafts and at its other end to the flywheel so that each intermediate shaft is connected independently to the flywheel by a torsion spring, a driven shaft, and a flexible connection between the flywheel and the driven shaft.

5. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a flywheel, at least two sets of straight bars each set connected together to form a torsion spring which is connected at one end to one of the intermediate shafts and at its other end to the flywheel so that each intermediate shaft is connected independently to the flywheel by a torsion spring, a driven shaft, a flexible connection between the flywheel and the driven shaft, and at least one flywheel driven by the torsion springs and located intermediate the ends thereof.

6. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a flywheel, at least two sets of straight bars each set connected together to form a torsion spring which is connected at one end to one of the intermediate shafts and at its other end to the flywheel so that each intermediate shaft is connected independently to the flywheel by a torsion spring, a driven shaft, a third set of straight bars forming a torsion spring and connected to the driven shaft and to the flywheel.

7. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a driven shaft, and at least two sets of straight bars each set connected together to form a torsion spring which is connected at one end to one of the intermediate shafts and at its other end to the driven shaft so that each intermediate shaft is connected independently to the driven shaft by a torsion spring, said torsion spring being spaced apart from and parallel to the axis of the driven shaft.

8. An automatically variable transmission gear comprising a driving shaft, two sets of planetary masses carried by the driving shaft, an intermediate shaft associated with and driven by one set of masses, a driven shaft, a number of straight bars grouped together to form a flexible shaft connected at one end to the driven shaft, gearing connecting the other end of the flexible shaft to the intermediate shaft, a rotary member, means to insure that the rotary member can rotate in one direction only, a gear connection between that end of the flexible shaft that is geared to the intermediate shaft and the rotary member, a second intermediate shaft comprising a sleeve surrounding the first mentioned intermediate shaft, and associated with and independently driven by the other set of masses, a second group of straight bars comprising a flexible shaft connected at one end to the driven shaft, and a gear connection between the other end of the second flexible shaft and the second intermediate shaft.

9. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a driven shaft, and at least two sets of straight bars each set arranged in the form of a hollow shaft to form a torsion spring which is connected at one end to one of the intermediate shafts and at its other end to the driven shaft so that each intermediate shaft is connected independently to the driven shaft by a torsion spring.

10. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a driven shaft, at least two sets of straight bars each set arranged in the form of a hollow shaft to form a torsion spring which is connected at one end to one of the intermediate shafts and at its other end to the driven shaft so that each intermediate shaft is connected independently to the driven shaft by a torsion spring, and at least one flywheel carried by the said springs and located intermediate the ends thereof.

11. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a driven shaft, and at least two sets of flat spring leaves each set connected together to form a laminated torsion spring which is connected at one end to one of the intermediate shafts and at its other end to the driven shaft so that each intermediate shaft is connected independently to the driven shaft by a torsion spring.

12. An automatically variable transmission gear comprising a driving shaft, at least two sets of planetary masses carried by the driving shaft, an intermediate shaft associated with each set of masses, connections between each intermediate shaft and the associated set of masses whereby the shaft is operated by the centrifugal impulses of the masses, a driven shaft, at least two sets of flat spring leaves each set connected together to form a torsion spring which is connected at one end to one of the intermediate shafts and at its other end to the driven shaft so that each intermediate shaft is connected independently to the driven shaft by a torsion spring, and at least one flywheel carried by the said springs and located intermediate the ends thereof.

13. A flexible coupling comprising at least two sets of straight bars each set connected together to form a torsion spring and each torsion spring being independently driven at one end and the other ends of the springs being connected to a common driven member.

14. A flexible coupling comprising at least two sets of straight bars each set connected to form a torsion spring and each torsion spring being independently driven at one end and the other ends of the springs being connected to a common driven member, and at least one flywheel carried by said springs and located intermediate the ends thereof.

15. A flexible coupling comprising at least two sets of straight bars each set connected together to form a torsion spring which springs are arranged parallel to a driven member to which they are all connected and which springs are independently driven.

16. A flexible shaft comprising a set of straight bars grouped together to form a torsion spring and connected at one end to a driven member, gearing connecting the other end of the spring so that the spring can twist about a longitudinal axis passing therethrough whilst rotating about an axis parallel therewith a similar spring connected at one end to the driven member, and a connection between the other end of said similar spring and a second driving member whereby the spring can be twisted about an axis passing longitudinally therethrough whilst rotating about the axis of the driving member.

17. A flexible shaft comprising a set of straight bars grouped together to form a torsion spring and connected at one end to a driven member, gearing connecting the other end of the spring so that the spring can twist about a longitudinal axis passing therethrough whilst rotating about an axis parallel therewith a similar spring connected at one end to the driven member, and a connection between the other end of said similar spring and a second driving member whereby the spring can be twisted about an axis passing longitudinally therethrough whilst rotating about the axis of the driving member and at least one flywheel driven by the springs and mounted intermediate the ends thereof.

18. A flexible coupling comprising at least two sets of straight bars each set of bars being arranged in the form of a hollow shaft and connected together to form a torsion spring which springs are connected at one end to a common driven member and are independently driven at their other ends.

19. A flexible coupling comprising at least two sets of straight bars each set connected together to form a torsion spring which springs are connected at one end to a common flywheel and are independently driven at their other ends, and a flexible connection between the flywheel and a driven shaft.

20. A flexible coupling comprising at least two sets of straight bars each set connected together to form a torsion spring which springs are connected at one end to a common flywheel and are independently driven at their other ends, and a flexible connection between the flywheel and a driven shaft, and at least one flywheel driven by said springs intermediate the ends thereof.

In testimony that I claim the foregoing as my invention I have signed my name this 27th day of May, 1931.

HOWARD FREDERICK HOBBS.